United States Patent [19]

Edel et al.

[11] 4,321,457

[45] Mar. 23, 1982

[54] METHOD AND DEVICE FOR THE BURNING OF AN ARTIFICIAL CARBON BODY, ESPECIALLY OF AN ANODE FOR THE ALUMINUM FUSION ELECTROLYSIS

[75] Inventors: Wilhelm Edel; Reinhold Heindl, both of Cologne; Friedel Isenhardt, Rösrath-Forsbach; Ernst Schultze-Rhonhof, Bonn, all of Fed. Rep. of Germany

[73] Assignee: Klöckner-Humboldt-Deutz Ag, Fed. Rep. of Germany

[21] Appl. No.: 123,341

[22] Filed: Feb. 21, 1980

[30] Foreign Application Priority Data

Feb. 21, 1979 [DE] Fed. Rep. of Germany ....... 2906678

[51] Int. Cl.³ .......................... H05B 1/02; H05B 3/74
[52] U.S. Cl. .................................... 219/497; 219/486; 219/483; 219/78.16; 13/31 R; 13/7; 29/25.1; 307/39
[58] Field of Search .................. 219/483, 484, 486, 87, 219/156, 497, 494, 78.01, 78.16; 307/39, 40, 41, 38; 29/25.1; 13/7, 9, 31, 34, 18 B

[56] References Cited

U.S. PATENT DOCUMENTS

| | | | |
|---|---|---|---|
| 1,884,600 | 10/1932 | Derby | 13/9 X |
| 2,911,542 | 11/1959 | Hoffstatter | 13/7 X |
| 3,736,360 | 5/1973 | Bergman et al. | 13/24 |
| 4,017,673 | 4/1977 | Michels et al. | 13/7 |

FOREIGN PATENT DOCUMENTS

| | | | |
|---|---|---|---|
| 769439 | 11/1971 | France | 13/7 |
| 373499 | 6/1973 | U.S.S.R. | 13/7 |
| 392119 | 12/1973 | U.S.S.R. | 13/24 |

*Primary Examiner*—B. A. Reynolds
*Assistant Examiner*—Mark H. Paschall
*Attorney, Agent, or Firm*—Hill, Van Santen, Steadman, Chiara & Simpson

[57] ABSTRACT

An apparatus to burn carbon bodies has at least two independently controllable electric resistance heating circuits, at least two temperature sensors and a comparator. Two or more regions of a selected carbon body can be independently heated by the two circuits. The actual temperature of each of those two or more regions can be monitored by corresponding temperature sensors connected to the comparator. The comparator controls each electric resistance heating circuit independently so as to minimize any difference between a preselected temperature and the actual temperature of each region.

2 Claims, 1 Drawing Figure

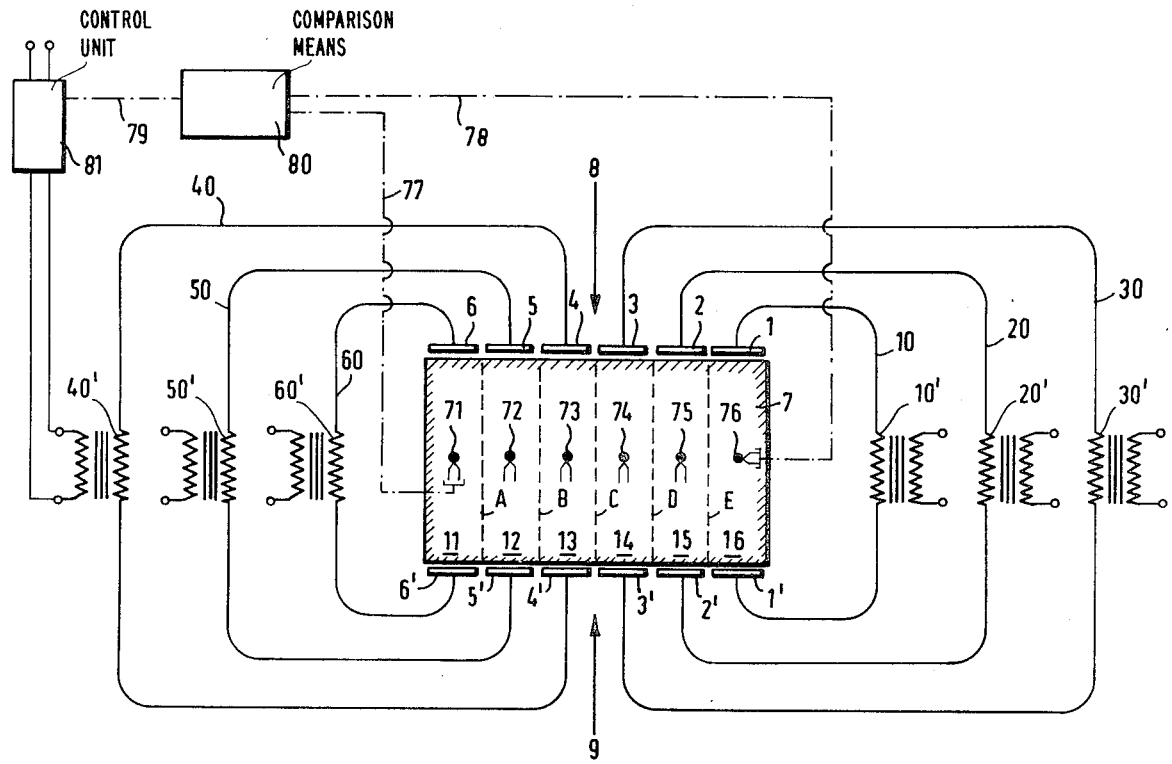

METHOD AND DEVICE FOR THE BURNING OF AN ARTIFICIAL CARBON BODY, ESPECIALLY OF AN ANODE FOR THE ALUMINUM FUSION ELECTROLYSIS

BACKGROUND OF THE INVENTION

1. Field of the Invention

The invention concerns a method as well as a device for the burning of an artificial carbon body, especially of an anode for the aluminum fusion electrolysis, whereby a pre-formed green casting [briquette] is heated up by means of electrical resistance heating.

2. The Prior Art

The prior art includes several known methods for burning artificial carbon bodies. A distinction is made between artificial carbon bodies upon which no extreme requirements are placed with respect to a possible low electric resistance coefficient. These are customarily subjected to a burning process with a maximum of 1350° C., designated in this area of the art often as "carbonization". The invention concerns this category.

Artificial carbon bodies which must in addition display extremely low resistance coefficients and/or high strength factors are produced according to the so-called Acheson method, whereby these electrodes following the carbonization are burnt by means of direct electric resistance heating at temperatures around 2800° C. This process is customarily designated in this area of the art as "graphitization".

For the burning of artificial carbon bodies, for example, the following different methods are used:

1. The castings, so-called "green" castings, are placed in a gas-fired furnace and are heated extremely slowly up to temperatures between 750° and 1350° C. They are kept for a period of time at said temperature and then are slowly cooled. This method which is designated in this area of the art as "roasting" or "baking" lasts between 15 and 50 days.

2. Graphitization of "roasted", that is preburned, artificial carbon bodies according to the Acheson method by means of electric resistance heating in a furnace, wherein the carbon castings themselves are employed as heating elements. Depending upon the size of the form bodies to be produced, the graphitization process takes between several hours to several days.

3. Burning of larger artificial carbon form bodies, for example, for the use in atomic energy reactors, by means of direct resistance heating of the green castings with simultaneous application of high pressures, for example, in the order of magnitude of 150 to 350 bar and above, in a stable mold under a mechanical power press, whereby relatively high heating rates come into use. For example, in the Great Britain Pat. No. 794,989, page 8, lines 52 through 54, heating rates are cited between 2° and 1000° C./min. The actual heating rates are in these instances dependent upon the dimensions of the body which is being heated.

A disadvantage in the use of the so-called "roasting" in gas-heated furnaces is that a duration of up to 50 days leads to uneconomical furnace dimensions and heat losses and thus correspondingly high costs of manufacture. This method is reliable though uneconomical.

The method of electric resistance heating in a mold under high pressures requires the employment of extremely expensive mechanical power press devices as well as pressure-proof forms, and it is thus not acceptable for economic reasons because of the outlay for machines and costs, for example, for the production of large burned carbon anodes for the aluminum fusion electrolysis.

There is thus a need for an economical procedure for the manufacture of large burned artificial carbon bodies, especially those usable as anodes for aluminum fusion electrolysis, with individual piece weights between 500 and 5000 kg. In such a method, preformed green blocks are burned with as high a heating rate as possible by means of electric resistance heating without the use of externally applied pressure.

SUMMARY OF THE INVENTION

Using the inventive method and apparatus, a preformed green casting is heated by means of at least two electric resistance heating circuits.

By means of using several circuits, the bulk of the body to be heated is subdivided into several zones which are heated independently of one another. As a result, a difficulty is eliminated which previously existed in the case of large carbon form bodies. Due to local fluctuations of the resistance in the material being heated, in the case of only one single circuit, significant local temperature differences resulted in the body. This problem is mentioned, for example, in the British Pat. No. 1,470,640 on page 1, lines 55 through 59. Such local temperature differences previously led in the worst case to a breakdown of the casting being heated, at the very least, fissures occurred whose size depended upon the size of the artifical carbon body. These difficulties, which were previously seen to be insurmountable in the case of the electric heating of large artificial carbon bodies, are eliminated with the invention.

With the subdivision of the current supply during the burning process into at least two current and heating loops and with the resulting subdivision brought about thereby of the heated bulk into a number of parallel heating zones, corresponding to the number of circuits employed, the irregularity of the heating of the body is kept under control.

It is thus further provided in the design of the invention in an advantageous manner that the heating can be accomplished without the use of external pressure forces worthy of mention. The inventive method and apparatus has the advantage of a significant reduction of the operating costs as well as a saving in equipment costs. As a result, the economy of the production process is significantly improved.

In a further design of the invention the heating circuits are connected in parallel and are adjustable individually and preferably independently of one another with respect to the values of voltage and/or current intensity. By means of this measure, the advantage of independent regulatability zones which are parallel with one another and are heated in one and the same artificial carbon body is achieved.

In a practical design of the method, it is further provided that the control values of each heating circuit are regulated in accordance with the control values of at least one further circuit. The individual circuits are controlled in a specific output, voltage, or current intensity relationship with respect to one another to minimize extreme variations.

Another practical design of the invention provides that the control values of a heating circuit are regulated in accordance with at least one local temperature value of the artificial carbon body. This measure produces the advantage that the occurrence of locally different temperature zones in the burned artificial carbon body is prevented by means of corresponding control and regulating measures.

A further advantageous design of the method according to the invention provides that the direction of the current flow through the artificial carbon body is rectified to the direction of application of the force and/or of the field of force which is used in the compression of the green artificial carbon body, while it was being formed. This measure is especially advantageous in the case of a large green artificial carbon body formed by compression forces generated by means of a jarring or vibrating device. It has been shown that the direction of the field of force which brings about the compression brings about an effect with orients the resistance coefficient of the bulk in a specific direction. As a result, a greater homogeneousness of the surface resistance coefficients and thus a more uniform heating process was observed when the current supply electrodes and thus the current flow was applied in the same direction in which the compression process had proceeded during the forming of the green artificial carbon body.

It is finally provided in a design of the method that the preformed green casting be burned without significant intermediate cooling starting from the temperature which results from the manufacturing process. An advantage results from starting at the manufacturing temperature of the body in that the previous cooling process is avoided, as is the loss of the heat content which is driven out during the cooling. Not only does this heat content not need to be replaced in the inventive method but since the green casting, at the point in time of the manufacture, possesses a temperature which is absolutely the same at all locations, due to the process of forming the body, it displays ideal prerequisites for the beginning of the electric burning process.

A device for the execution of the method according to the invention is characterized by at least two circuits with, in each case, a pair of current supply electrodes. A design of the device provides that in the artificial carbon body, probes are arranged for the measurement of the temperature, whereby preferably at least one probe is associated with each region of the artificial carbon body between a pair of electrodes.

Finally, a practical design of the device according to the invention consists in the arrangement of a regulating unit which is connected with the probes by means of pilot wires. The regulating unit controls the heating output of each heating circuit in accordance with the temperature values determined by the associated temperature probes by means of control circuits associated with each of the individual heating circuits.

BRIEF DESCRIPTION OF THE DRAWINGS

The single FIGURE shows a large carbon body being heated as several, parallel, adjacent volumes by a group of independently controlled heating circuits.

DESCRIPTION OF THE PREFERRED EMBODIMENTS

Not by way of limitation, but by way of disclosing the best mode of practicing our invention and by way of enabling one of skill in the art to practice our invention, the invention will be explained more precisely with the use of the FIGURE. The FIGURE, a schematic block diagram, shows a carbon casting 7 which is to be burned, on a pair of frontal sides 8 and 9. In each case, an electrode pair 1, 1'; 2, 2'; 3, 3'; 4, 4'; 5, 5'; and 6, 6' is applied to the sides 8, 9. The electrode pair 1, 1' is connected to a circuit 10, the electrode pair 2, 2' to a circuit 20 and so on. Each electrode pair 1, 1' through 6, 6' is associated in each case with an independent circuit 10, 20 30, 40, 50, 60.

The FIGURE indicates that the circuit 10 is connected to the secondary coil of a transformer 10' which is represented schematically. The circuit 20 to the secondary coil of the transformer 20', the circuit 30 to the secondary coil of the transformer 30', circuit 40 to the secondary coil of the transformer 40', circuit 50 to the secondary coil of the transformer 50', circuit 60 to the secondary coil of the transformer 60'.

As a result of the current supplied from a multiplicity of parallelly applied circuits 10 through 60 which are regulatable and which act independently of one another the body is divided while being heated, into a number of parallel heating zones 11, 12, 13, 14, 15, 16. For better visualization, the imaginary zones 11 through 16 which are associated by means of dotted lines A, B, C, D. E.

In the FIGURE, a set of temperature sensors or measuring probes 71–76, shown schematically is indicated. Each of the sensors 71–76 is associated with one of the zones 11 through 16. Pilot wires 77, 78 lead from the temperature measuring probes 71 and 76 to a regulating unit 80. Additional lines would similarly connect the sensors 72–75 to the regulating unit 80.

The function and use of the regulating unit 80 is well known to persons skilled in the art of control engineering. The unit 80, for example, compares a preset temperature index value with the actual value determined by each of the temperature measuring probes 71 through 76. In the case of deviation between preset and sensed temperatures in region 13, for example, it provides a regulating pulse which is connected with a wire 79 to a heating control unit 81. The control unit 81 varies the power applied to the primary coil of the transformer 40'. This varies the power applied through the circuit 40 to the region 13 of the body 7 between lines B–C. The temperature of this section of the body 7 is then sensed by the sensor 73 and fed back to the unit 80. Corresponding to the function of the total regulating schema, the remaining circuits 10, 20, 30, 50, 60 have heating control units corresponding to the unit 81 associated with them. Each of the additional heating control units would be connected by a wire to the comparison means 80.

By means of the heating control unit 81, the current intensity and/or the voltage of the regulated circuit 40, and in an analogous manner by means of correspondingly similar control units, the current intensity and/or voltage of the remaining circuits are adjusted independently of one another. That is, each circuit is an independently operating closed loop temperature control system.

The invention is, of course, not limited to the embodiment example shown. Thus, for example, the number of independent heating circuits can be selected in a random manner from at least two circuits to an unlimited multiplicity. Additionally various forms of regulation, as well as various designs of corresponding devices, all come within the scope of our invention.

Thus, while various modifications or changes might be proposed or suggested by those skilled in the art, it will be understood that we wish to include all such modifications and changes within the scope of the claims warranted hereon all such modifications and changes as reasonably come within our contribution to the art.

We claim as our invention:

1. In a method for burning an artificial carbon body, especially usable as an anode for aluminum fusion electrolysis, where the body, a preformed green casting, is heated by means of electric resistance heating, an improvement comprising the steps of:

dividing the casting into at least two regions, and heating each region essentially independently by passing a separately adjustable electrical current through each region of the casting;

sensing the temperature of each region of the casting;

comparing the sensed temperature of each region of the casting to a preselected value;

adjusting the power supplied to each region by the associated electric resistance heating circuit so as to minimize any difference between the sensed temperature of each region and the preselected value; and selecting the direction of current flow through each region of the casting to correspond to the direction of the forces used in compressing the green artificial carbon body while forming the casting.

2. The improved method according to claim 1 including a further step of maintaining the casting at the temperature which results from the manufacturing process until the heating of each region of the casting is initiated.

* * * * *